United States Patent
Prevrhal et al.

(10) Patent No.: US 9,646,393 B2
(45) Date of Patent: May 9, 2017

(54) CLINICALLY DRIVEN IMAGE FUSION

(71) Applicant: KONINKLIJKE PHILIPS N.V., Eindhoven (NL)

(72) Inventors: Sven Prevrhal, Hamburg (DE); Eberhard Sebastian Hansis, Hamburg (DE); Joerg Bredno, San Francisco, CA (US); Jinghan Ye, Cupertino, CA (US); Xiyun Song, Cupertino, CA (US); Chi-Hua Tung, Aurora, OH (US); Lingxiong Shao, Saratoga, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/375,176

(22) PCT Filed: Jan. 28, 2013

(86) PCT No.: PCT/IB2013/050710
§ 371 (c)(1),
(2) Date: Jul. 29, 2014

(87) PCT Pub. No.: WO2013/118017
PCT Pub. Date: Aug. 15, 2013

(65) Prior Publication Data
US 2015/0003708 A1    Jan. 1, 2015

Related U.S. Application Data

(60) Provisional application No. 61/597,219, filed on Feb. 10, 2012.

(51) Int. Cl.
*G06K 9/00* (2006.01)
*G06T 11/00* (2006.01)
(Continued)

(52) U.S. Cl.
CPC .............. *G06T 11/005* (2013.01); *G06T 5/50* (2013.01); *G06T 7/97* (2017.01); *G06T 11/008* (2013.01);
(Continued)

(58) Field of Classification Search
CPC ......... G06T 11/00; G06T 7/97; G06T 11/008; G06T 5/50; G06T 2211/416;
(Continued)

(56) References Cited

U.S. PATENT DOCUMENTS

| 5,954,650 A | 9/1999 | Saito et al. |
| 7,356,367 B2 * | 4/2008 | Liang ..................... A61B 5/055 600/407 |

(Continued)

OTHER PUBLICATIONS

Kim, J., et al.; Data Visualization and Display; 2007; Chapter 9-Biomidal Information Technology; 1st Ed.; Elsevier; pp. 211-227.
(Continued)

*Primary Examiner* — Oneal R Mistry

(57) ABSTRACT

A medical imaging system includes a data store (16) of reconstruction procedures, a selector (24), a reconstructor (14), a fuser (28), and a display (22). The data store (16) of reconstruction procedures identifies a plurality of reconstruction procedures. The selector (24) selects at least two reconstruction procedures from the data store of reconstruction procedures based on a received input, each reconstruction procedure optimized for one or more image characteristics. The reconstructor (14) concurrently performs the selected at least two reconstruction procedures, each reconstruction procedure generates at least one image (26) from the at least one data store of imaging data (12). The fuser (28) fuses the at least two generated medical images to create a medical diagnostic image which includes characteristics from each generated image (26). The display (22) displays the medical diagnostic image.

7 Claims, 4 Drawing Sheets

Figure 1:
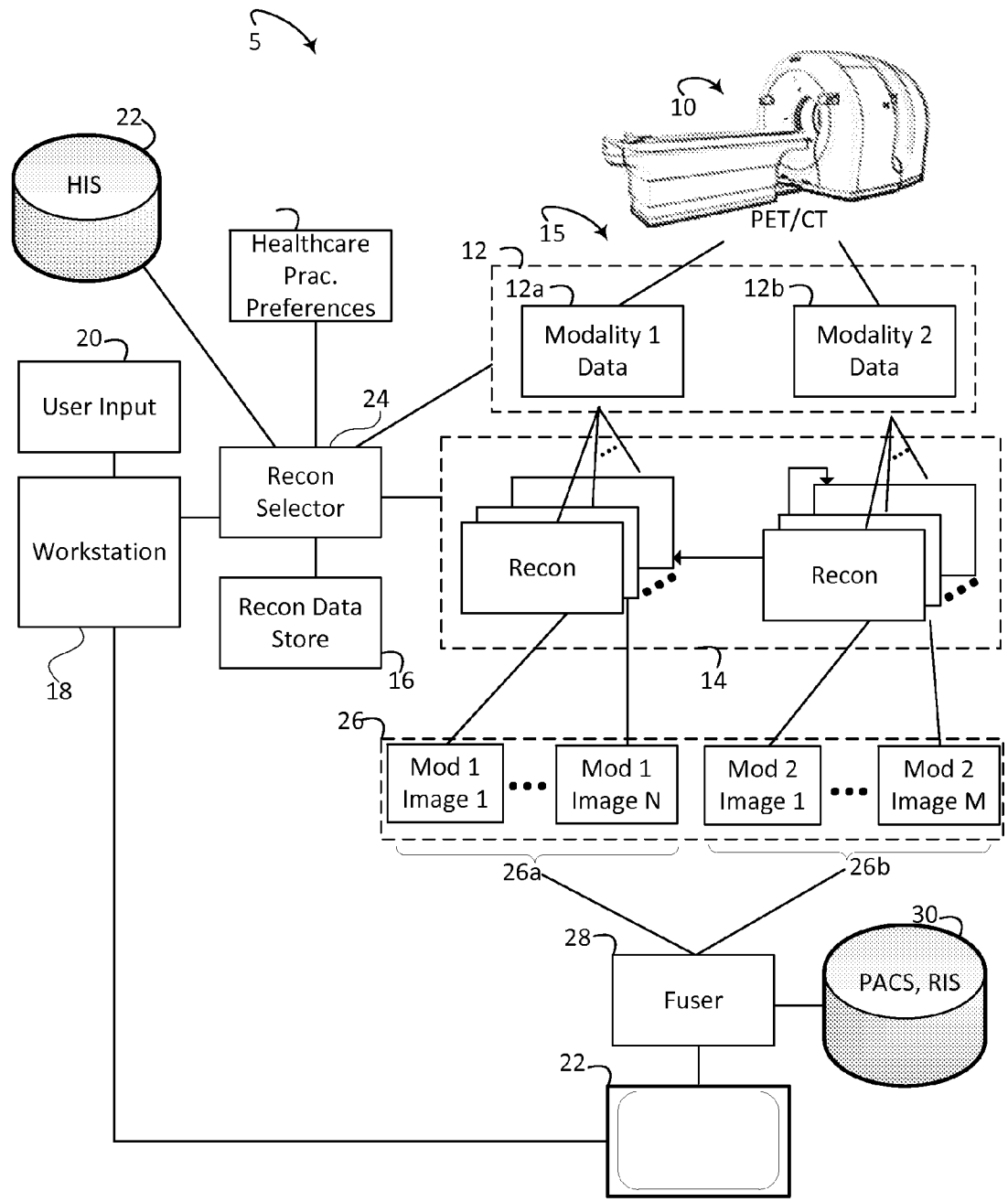

(51) Int. Cl.
*G06T 5/50* (2006.01)
*G06T 7/00* (2017.01)

(52) U.S. Cl.
CPC ............... *G06T 2207/10072* (2013.01); *G06T 2207/10081* (2013.01); *G06T 2207/10084* (2013.01); *G06T 2207/10104* (2013.01); *G06T 2207/20008* (2013.01); *G06T 2207/20221* (2013.01); *G06T 2207/30004* (2013.01); *G06T 2211/416* (2013.01)

(58) Field of Classification Search
CPC . G06T 2207/10104; G06T 2207/10084; G06T 2207/10081; G06T 2207/20008; G06T 2207/20221; G06T 2207/10072; G06T 2207/30004; G06T 11/005
See application file for complete search history.

(56) References Cited

U.S. PATENT DOCUMENTS

| | | | |
|---|---|---|---|
| 7,620,223 B2 | 11/2009 | Xu et al. | |
| 7,983,462 B2* | 7/2011 | Sauer | G06T 5/50 382/131 |
| 2006/0004275 A1* | 1/2006 | Vija | A61B 6/00 600/407 |
| 2006/0210131 A1 | 9/2006 | Wheeler et al. | |
| 2007/0140537 A1* | 6/2007 | Heigl | G06T 15/08 382/128 |
| 2008/0107312 A1 | 5/2008 | Von Berg | |
| 2008/0144910 A1 | 6/2008 | Weissenborn | |
| 2008/0298664 A1* | 12/2008 | Martin | A61B 6/5247 382/131 |
| 2010/0022878 A1 | 1/2010 | Azuma et al. | |
| 2010/0177191 A1* | 7/2010 | Stier | G01N 21/8806 348/92 |
| 2011/0243418 A1* | 10/2011 | Sugiura | G01R 33/5608 382/131 |
| 2011/0280459 A1* | 11/2011 | Nakanishi | A61B 6/032 382/131 |
| 2012/0121147 A1* | 5/2012 | Huang | G06T 7/0026 382/131 |
| 2014/0056502 A1* | 2/2014 | Twellmann | G06T 7/0012 382/131 |

OTHER PUBLICATIONS

Ratib, O.; PET/CT Image Navigation and Communication; 2004; J. of Nuclear Medicine; 45(1)46S-51S.

* cited by examiner

CLINICALLY DRIVEN IMAGE FUSION

CROSS REFERENCE TO RELATED APPLICATIONS

This application is a national filing of PCT application Serial No. PCT/IB2013/050710, filed Jan. 28, 2013, published as WO 2013/118017 A1 on Aug. 15, 2013, which claims the benefit of U.S. provisional application Ser. No. 61/597,219 filed Feb. 10, 2012, which is incorporated herein by reference.

The present application relates generally to medical imaging. It finds particular application in conjunction with image reconstruction and presentation, and will be described with particular reference thereto. However, it will be understood that it also finds application in other usage scenarios and is not necessarily limited to the aforementioned application.

Healthcare practitioners select an imaging reconstruction procedure based on a physician request and information about the subject from the medical record. The reconstruction procedure is based on a particular reconstruction algorithm and uses a selected set of reconstruction parameters. The reconstruction procedure is typically selected to produce an image with a characteristic that will best answer the clinical question posed by the physician request. After the resulting image is reviewed, a different reconstruction procedure is often selected to generate an image optimized with a different characteristic or better show the first characteristic. In a linear fashion, the healthcare practitioner constructs a set of images which according to past practice produces an answer to the clinical question based on the physician request. The linear fashion of selecting and performing a reconstruction, reviewing the images, and selecting and performing a new reconstruction, etc. uses valuable clinical time.

Reconstruction procedures typically produce an image optimized in at least one category and often involve a trade-off between categories. For example, one reconstruction procedure can be optimized for high resolution, a second reconstruction procedure optimized for grayscale accuracy, and a third optimized for low noise. For a particular clinical application, the data for a region of interest can be reconstructed multiple times. Each reconstruction is typically optimized for a purpose. The reconstruction parameters include various filters that can be applied during a reconstruction. Final selection of the procedure can be based on preferences of a healthcare practitioner, a protocol, a healthcare site, specific to an image sequence for an individual subject, or a combination of these. The selection process typically is a conglomeration of preferences and practices over time and may not reflect best practices. In addition, the linear aspect of selecting a set of reconstruction parameters, viewing an image, and then selecting an alternative set of reconstruction parameters followed by clinical time. In the instance of repeated reconstructions, the healthcare practitioner mentally accumulates the information across the various images by flipping back and forward between images to make comparisons and draw conclusions. Clinical time pressures act to reduce the number of alternative reconstructions.

The present application discloses a new and improved clinical driven image fusion which addresses the above referenced matters, and others.

In accordance with one aspect, a medical imaging system includes a data store of reconstruction procedures, a selector, a reconstructor, a fuser, and a display. The data store of reconstruction procedures identifies a plurality of reconstruction procedures. The selector selects at least two reconstruction procedures from the data store of reconstruction procedures based on a received input, each reconstruction procedure optimized for one or more image characteristics. The reconstructor concurrently performs the selected at least two reconstruction procedures, each reconstruction procedure generates at least one image from the at least one data store of imaging data. The fuser fuses the at least two generated medical images to create a medical diagnostic image which includes characteristics from each generated image. The display displays the medical diagnostic image.

In accordance with another aspect, a method of medical imaging includes receiving an input for a medical diagnostic image. At least two reconstruction procedures are selected based on the received input, each procedure optimized for one or more image characteristics. Each reconstruction procedure is concurrently performed on a received imaging data which generates at least one image with the imaging characteristics. The generated images are fused into the medical diagnostic image which includes at least one imaging characteristic from each generated image. The fused images are displayed on a display device.

In accordance with another aspect, a medical imaging system includes one or more modules which obtain a clinical purpose for a medical diagnostic image and using received imaging data, concurrently perform at least two reconstruction procedures based on the clinical purpose, each reconstruction procedure optimized for one or more image characteristics, and generate the medical diagnostic image which includes at least one image characteristic from each reconstruction.

One advantage is reconstruction procedures are selected based on the clinician question posed and can include best practices.

Another advantage resides in improved workflow.

Another advantage resides in reduced reconstruction delays.

Another advantage resides in fusion of image characteristics which ease clinical interpretation.

Still further advantages of the present application will be appreciated to those of ordinary skill in the art upon reading and understanding the following detailed description.

The invention may take form in various components and arrangements of components, and in various steps and arrangement of steps. The drawings are only for purposes of illustrating the preferred embodiments and are not to be construed as limiting the invention.

FIG. 1 illustrates with a system block diagram an embodiment of the clinically driven medical imaging system.

Figure 2:
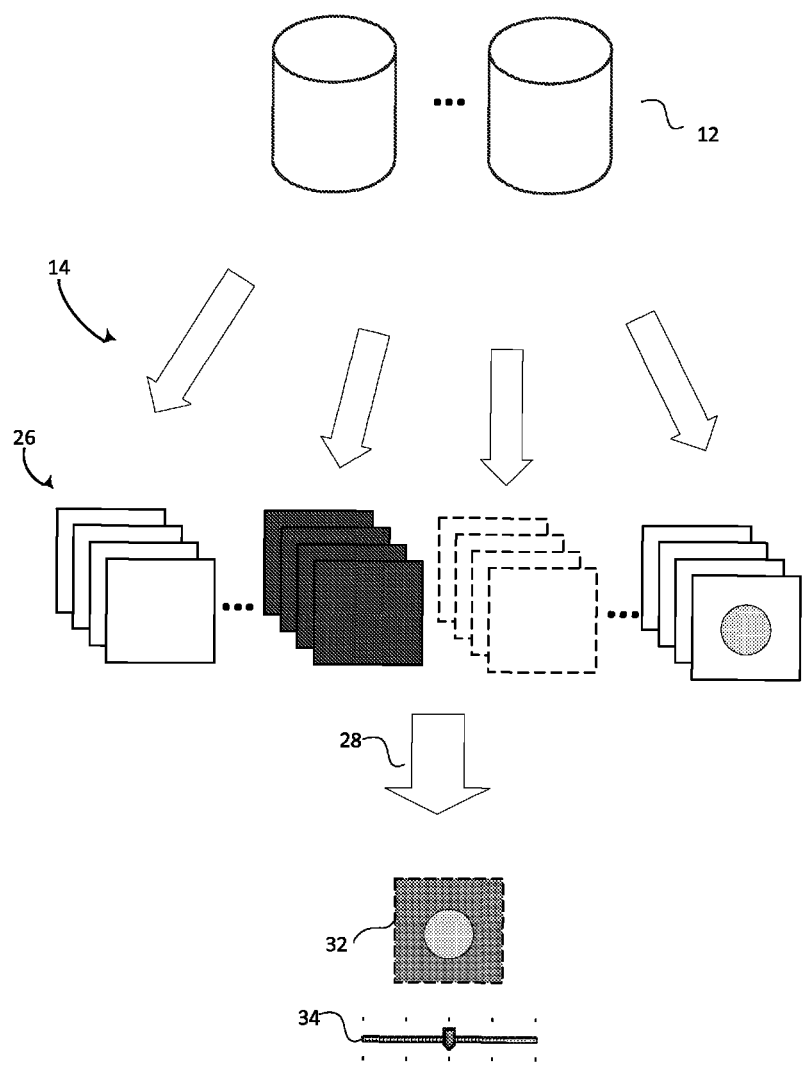

FIG. 2 diagrammatically illustrates an embodiment of the clinically driven medical imaging system operation with multiple imaging modalities and an alternative image fusion technique.

Figure 3:
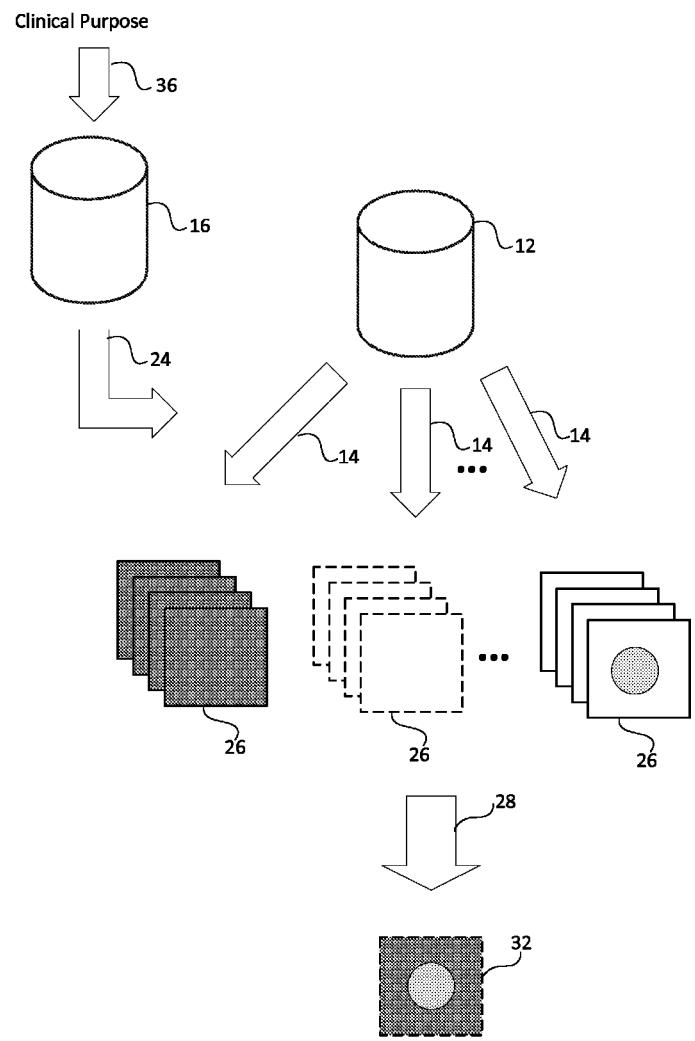

FIG. 3 diagrammatically illustrates an embodiment of the clinically driven medical imaging system operation.

Figure 4:
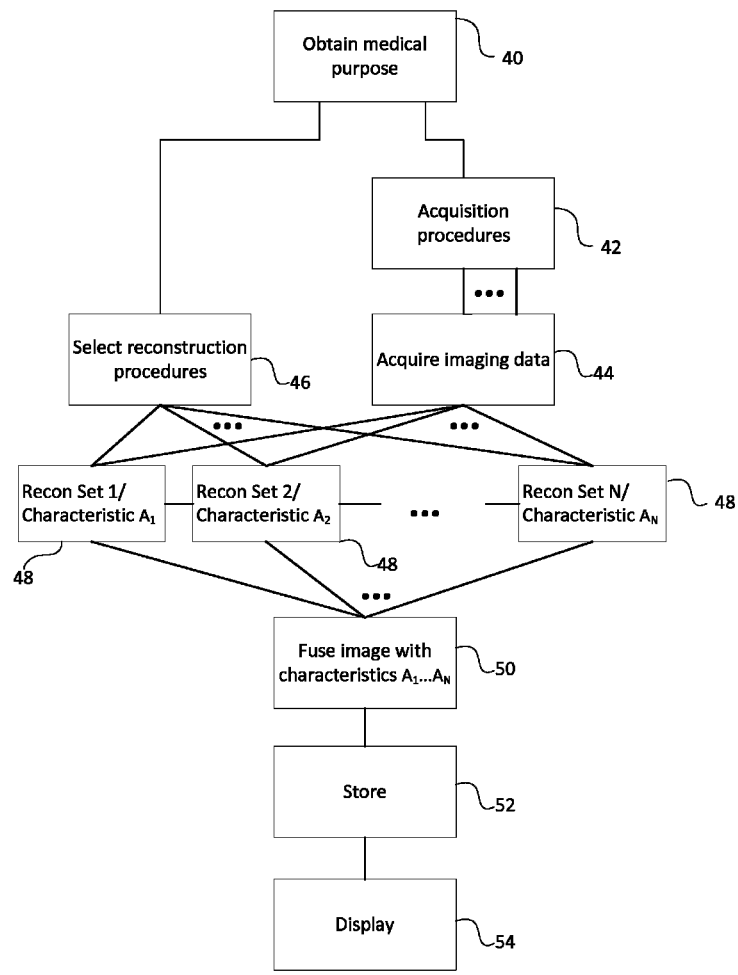

FIG. 4 flowcharts an embodiment of the clinically driven medical imaging system.

FIG. 1 illustrates with a system block diagram an embodiment of the clinically driven medical imaging system 5. Imaging data is recorded by one or more medical imaging devices 10 such as a x-ray Computed Tomography (CT) scanner, a Magnetic Resonance (MR) scanner, a Positron Emission Tomography (PET) scanner, a Single Positron Emission Tomography (SPECT) scanner, an ultrasound scanner, a combination or hybrid scanner, and the like. Hybrid scanners such as CTPET, PETMR, SPECTCT, SPECTMR, are advantageous because the data and images of all modalities are inherently registered. One or more imaging data sets 12 are produced by each medical imaging device 10 during image acquisition and are stored in a data store such as storage locally in server memory or disk storage or in non-transient remote data storage such as network attached storage and the like. The one or more imaging data sets are co-registered.

The one or more imaging data sets 12 are processed by the reconstructor 14. The reconstructor 14 includes one or more reconstruction processors or other reconstruction modules. Each reconstruction procedure operates on at least one imaging data set 12. Information created in one reconstruction procedure such as an attenuation map, probability map, etc., can be used as input into a second reconstruction procedure which operates on the imaging data set of the same or a different modality. For example, a CT reconstruction procedure creates or outputs an attenuation map which is input by a PET reconstruction processor for attenuation correction. The reconstructor 14 coordinates processing between the various reconstructions and manages generated images from each reconstruction procedure. Each reconstruction procedure includes a reconstruction algorithm, reconstruction parameters, optional input from another procedure and optionally one or more filters. The reconstruction procedures generate images such as 2D, 3D, 2D portion of a 3D volume, surface rendering, and the like.

The reconstruction procedures are stored in a reconstruction procedure data store 16 indexed by clinical purpose. Each reconstruction procedure uses a reconstruction algorithm and one or more reconstruction parameters. The reconstruction parameters include information about the type of imaging data such as MR, PET, SPECT, CT and the like. The parameters can include parameters for the particular device implementation, localization, or protocol. The parameters can include pre-processing or post-processing settings such as filter settings and the like. For example, in a tumor treatment follow-up, one reconstruction procedure can be optimized for detail to show the shape of the remaining tumor. Another reconstruction procedure can be optimized to delineate spatial relationships between the tumor and various organs involved. Yet another reconstruction procedure can be optimized for quantification of an uptake value of a radio-isotope. In another example involving hybrid scanners, one CT or MR reconstruction can be optimized for the purpose of attenuation correction and a second CT or MR reconstruction is optimized for the purpose of diagnostic viewing of hybrid data. The data store can be a database, a file system, a collection of objects, and the like. For example, the clinical purpose can be related to many reconstruction procedures using a relational table. In another example, each reconstruction procedure including the algorithm and parameters is stored as an object and the object method includes the clinical purpose. The clinical purpose includes follow-up to a treatment such as radiation therapy, a diagnostic search, an investigative purpose, and the like.

The clinical purpose is derived from one or more sources such as input from a workstation 18, from a patient medical record, a hospital information system (HIS) 19, and the like. The workstation 18 includes at least one input device 20 such as a keyboard, microphone, mouse, etc., and a display device 22. The workstation 18 can be a special designated display workstation, desktop computer, laptop, tablet, smartphone, and the like. The clinical purpose can be manually input by a healthcare practitioner using the workstation 18 through the input device 20. The clinical purpose can be a free form input, input into a form, a selection from a menu displayed on the display device 22. The clinical purpose can be input from the patient medical record or HIS system using data mining or transactional processing. The clinical purpose is derived from the physician order which can be a separate system, part of an electronic medical record, part of the HIS, etc. depending upon the implementation by a healthcare provider.

The patient medical record can also contribute information which can affect the selection of reconstruction procedures such as prior history, other examinations, implants, etc. For example, a knee scan of a patient with knee pain with an artificial knee implant includes a filter to remove glare due to metal in implant. The presence and type of implant can typically be found in the patient medical record, if not indicated in the physician order.

One clinical purpose can relate to many reconstruction procedures. For example, an imaging order for tumor staging assessment includes reconstruction procedure optimized for spatial relationships, and another reconstruction procedure optimized for quantitative measurement. In the example, the clinical purpose includes tumor staging or where in the body is the cancer present. In another example, the clinical purpose is a neck tumor treatment follow-up which includes at least one reconstruction procedure optimized for high resolution, and another reconstruction procedure optimized for measurement of the tumor size and shape such as quantitative measurement of the tumor volume based on radioisotope uptake.

A reconstruction procedure selector 24, such as a processor, algorithm, module, or the like, selects the reconstruction procedures for the reconstructor based on the clinical purpose for the diagnostic medical imaging. The selector 24 identifies the imaging data sets 12 and the associated modalities, inputs the clinical purpose and selects the appropriate reconstruction procedures from the reconstruction data store 16 to be concurrently processed by the reconstructor 14. The selection of reconstruction procedures based on clinical purpose are reflections of best practices. The selection process can be localized such as based on a healthcare practitioner preferences 25. Localization can also include parameters specific to local imaging devices, image collectives, protocols, and the like. The localization can optionally include a data store of healthcare practitioner preferences.

The selected reconstruction procedures are processed by the reconstructor 14 and each generate at least one image 26 optimized for one or more imaging characteristics. Image characteristics include contrast sensitivity, detail aspects, spatial relationships, artifact minimization, quantitative measurement and the like. Several images can share similar characteristics. For example, multiple CT reconstructions include optimization for high resolution but one reconstruction procedure applies a filter for edge enhancement. A second reconstruction procedures applies a different filter for edge enhancement. The characteristics can be different. In another example, multiple CT reconstructions include a first optimized for detail which includes high resolution and a second optimized for artifact reduction.

A fuser 28, such as an image fusion processor, algorithm, video board, or the like, fuses the characteristics of the generated images 26 from each reconstruction procedure into a medical diagnostic image. The fuser 28 merges the generated images 26 using a variety of techniques into the medical diagnostic image. For example, a first reconstruction procedure generates a PET image optimized for quantification measurement of a tumor metabolic activity based on uptake of a radioisotope, a second CT image is optimized for high resolution, a third CT image is optimized for artifact reduction such as heart motion. The area of the high resolution second CT image which includes the expected artifact is substituted with the area from the third CT image. The fused second and third image is overlayed with the quantified measurement of tumor metabolic activity for the medical diagnostic image. Further reconstruction results that were created as input for another reconstruction (e.g., attenuation and scatter correction information) might not be presented as part of the final medical diagnostic image. The medical diagnostic image can be displayed on the display device 22 and/or stored in an image storage system 30 such as a Picture Archiving and Communication System (PACS), a Radiology Information System (RIS), patient records database, the hospital information system, and the like.

The selector 24, reconstructor 14, and fuser 28 are suitably embodied by an electronic data processing device, such as the electronic processor or electronic processing device of the workstation 18, or by a network-based server computer operatively connected with the workstation 18 by a network, or so forth. The fuser 28 is suitably embodied by the workstation 20. Moreover, the disclosed reconstruction and image fusion techniques are suitably implemented as a non-transitory storage medium storing instructions (e.g., software) readable by an electronic data processing device and executable by the electronic data processing device to perform the disclosed reconstruction and image fusion techniques.

FIG. 2 diagrammatically illustrates an embodiment of the medical imaging system 5 operation with multiple imaging modalities and an alternative fusion technique. Multiple data sets of the imaging data 12 are received from the one or more medical imaging devices 10 and stored in a data store. The same medical imaging device 10 can produce multiple imaging data sets with different acquisition parameters or the same parameters with a temporal or other difference. The multiple data sets 12 can include multiple acquisition modalities such as MR, PET, SPECT, CT, and the like. Preferably, representation of multiple modalities in the imaging data sets 12 are inherently registered. The data sets can be received directly from the medical imaging device 10 and stored in a data store, or received from a data store which received them previously from the medical imaging device. The data store of imaging data 12 includes information about the imaging data necessary for image reconstruction.

The selected reconstruction procedures process the imaging data 12. Each reconstruction procedure performed by the reconstructor 14 generates at least one image 26 optimized for one or more image characteristics. The characteristics are based on the clinical purpose identified by the selector 24 to produce the medical diagnostic image which reflects best practices.

The fuser 28 fuses the characteristics of the reconstructed images to create the medical diagnostic image 32 and can also include additional local practices and/or customizations. The medical diagnostic image 32 presented includes an initial image overlay, and a user selectable input 34 such as a slider bar, check box, radio buttons, and the like. The choice of image overlay is input by the healthcare practitioner using at least one input device to indicate various alternative image overlays such as the high resolution images with different contrasts. The user selectable input 34 can order the image overlays by a scale indicative of the characteristic such as detail, sharpness, frequency of use, relative contribution of fused images, color enhancement, and the like. For example, high resolution images can be ordered by the image resolution such as millimeters per pixel, by frequency of usage in a PACS, by alphabetic order of description, etc.

FIG. 3 illustrates an embodiment using only one modality scanner. The imaging data set 12 is received from a medical imaging device 10 or retrieved from a data store. The selector 24 associates the input clinical purpose with selected reconstruction procedures using a data store 16 accessed by the clinical purpose. The clinical purpose can be obtained by workstation input, a data store such as the patient medical record, a system such as a HIS, or some combination.

The selector 24 can modify with additional information the selection of reconstruction procedures such as the presence of implants or pieces of metal, prior history, previous studies, and the like. The selector determines the selection of concurrent reconstruction algorithms and associated parameters such as filtered-back-projection (FBP), FBP Feldkamp variant, simultaneous algebraic reconstruction techniques, FBP with smoothing, iterative maximum likelihood methods, etc. The selected procedures can optionally include additional filtering methods to remove distortions due to presence of metal, compare with prior studies, remove artifacts, and the like.

Each reconstruction procedure concurrently performed by the reconstructor 14 is optimized for at least one imaging characteristic such as resolution or detail, edge delineation, sharpness, anatomical contours, spatial relationships, quantitative measurement, contrast, noise reduction, artifact reduction, and the like. The reconstructions are performed concurrently and can be transparent to the healthcare practitioner. Because the reconstructions are performed in parallel, the overall time for an imaging study is reduced. The generated images 26 from each reconstruction procedure include at least one image characteristic.

The fuser 28 fuses the image characteristics from each of the generated images 26. The generated images 26 are inherently co-registered. The fuser 28 merges the characteristics from each generated image 26 using overlay techniques, substitution, or a combination. For example, a high resolution image from one reconstruction can be overlayed with a image with sharp edge delineation from another reconstruction. In another example, the user delineates a key hole 36 or region on one of the images and the corresponding region of another image with different characteristics is displayed in the key hole. Voxels within a displayed region of interest such as voxels optimized for accuracy of uptake of a radioisotope from a third reconstruction are substituted in the overlayed image. The fused medical image or medical diagnostic image 32 includes characteristics of each generated image 26 such as high resolution, sharp edges, and accuracy of uptake for a region of interest. The substituted voxels from one image can be based on a geometric pattern, an anatomical segment, a user defined area, and the like. The medical diagnostic image 32 can be displayed on a display device 22 and/or stored in the image storage system 30.

The medical diagnostic image 32 in an alternative embodiment uses information from a first image reconstruction in a second reconstruction, but is transparent to the healthcare practitioner. As an example, an attenuation correction map is produced from the first image reconstruction and is used to generate or modify the display of a second image reconstruction, but the first image is never included in the fused medical image.

With reference to FIG. 4 an embodiment of a medical imaging method is flowcharted. In a step 40, the clinical purpose is obtained. The clinical purpose is input to the system from one or a combination of sources. The input can be a healthcare practitioner entry at a workstation using at least one input device. The input from the healthcare practitioner can be answers to questions, entry into a form, selection from a menu of services, or the like. The input can be a physician order from an order entry system as part of a hospital information system (HIS). The input can be from the patient medical record. The patient medical record can contain information such as a diagnosis, disease, condition, or injury, prior treatment, current treatment, etc. The information can be indicative of the type of study needed or suggest a modification to an expected imaging study.

In one embodiment, in a step 42, the imaging modalities and imaging parameters are selected based on the purpose. In a step 44, the scanners are controlled to acquire image data. The imaging data sets range from one modality and one data set to many modalities and many imaging data sets. Preferrably data acquisition is performed concurrently.

In a step 46, the selector selects two or more reconstruction procedures to be performed concurrently on the received imaging data. The imaging data is acquired in the previous steps and/or received from a data store. The reconstruction procedures are based on the best practices for clinical purpose, but can be modified. Modified reconstruction procedures include modification of parameters or algorithms based on the selected patient history and current condition.

In multiple concurrent steps 48, the reconstructor performs concurrent, parallel, interleaved image reconstructions with the selected reconstruction procedures. The more than one reconstruction procedure are performed by one or more processors. The parallelism offered by concurrent reconstruction reduces the amount of clinical time for a study. Each selected reconstruction procedure generates at least one image and/or information from the one or more of the imaging data sets using algorithm, parameters, inputs, etc., included in the reconstruction procedure. The generated images include at least one 2D result image which includes a 2D image, a series of 2D slices that define a volume, a 3D volume image, a surface rendering image, a projection image, a contrast enhanced image, a functional image, and the like. The reconstruction procedure can also produce information such as attenuation correction, probability maps, etc., which enhance displayed images or image characteristics. The reconstructions, in some instances, exchange reconstruction resources, and, where applicable, exchange partially or fully processed data. In one embodiment, the first reconstructions completed are those prescribed by best practices guidelines. Reconstructions using reconstruction filters and characteristics based on clinician preferences can be performed immediately following, using partially processed data where applicable. In another embodiment, images are generated for a plurality of purposes. If reconstruction resources are sufficient, all are performed concurrently. If resources are not sufficient, reconstructions performed concurrently for the first images that will be analyzed followed seamlessly and partially overlapping for the next images to be analyzed, automatically without waiting for user input.

In a step 50, the fuser fuses the generated images into a medical diagnostic image. The diagnostic image can be displayed in a step 52 and/or stored in a step 54 for later review. The diagnostic image includes characteristics of multiple image reconstructions. The characteristics are included in the display image by overlay techniques, and substitution. The overlay and substitution can be by image or portion of the image. The portion of the image can be by geometric shape, anatomical feature, user defined, and the like. The overlay and substitution can be included in the initial display or be selected by the healthcare practitioner using a input device and a user selectable input 35 such as a slider bar, check box, pointer, and the like.

In another embodiment, one set of reconstruction results is used to display and manually, interactively, or automatically determine regions of interest. The measurements presented for these regions of interest, e.g., average tracer uptake, are taken from a reconstruction optimized for quantization. This map is input for region of interest and image statistics and need not be presented to the user.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

What is claimed is:

1. A medical imaging system comprising:
  a data store of reconstruction procedures configured to identify a plurality of reconstruction procedures;
  a selector configured to select at least two reconstruction procedures from the data store of reconstruction procedures based on a received input, each reconstruction procedure being optimized for one or more image characteristics;
  a reconstructor configured to concurrently perform the selected at least two reconstruction procedures on a first dataset of imaging data of a first imaging modality, each reconstruction procedure generates at least one image from the data set, and on a second data set of imaging data of a second imaging modality which is different than the first imaging modality, wherein each reconstruction procedure generates at least one image from the second data set;

a fuser configured to fuse the generated medical images of the first imaging modality and the second imaging modality to create the medical diagnostic image which includes characteristics from each generated image, wherein the data sets of imaging data are received from one or more of:
   a positron emission tomography (PET) device;
   an x-ray computed tomography (CT) device; and
   a hybrid CT/PET tomography device; and a display device configured to display the medical diagnostic image.

2. A method of medical imaging, comprising:
receiving image data from a first diagnostic imaging apparatus for reconstruction into a medical diagnostic image;
acquiring co-registered imaging data from a second diagnostic imaging apparatus, the second imaging apparatus being different from the first imaging apparatus;
selecting at least two reconstruction procedures for the co-registered imaging data based on received input, each procedure being optimized for one or more image characteristics;
concurrently performing each reconstruction procedure on the co-registered imaging data and each concurrent reconstruction procedure generating at least one image with the one or more imaging characteristics for which it is optimized;
fusing the generated images; and
displaying the fused medical diagnostic image on a display device.

3. The method of medical imaging according to claim 2, wherein the at least one characteristic includes at least one of:
   contrast sensitivity;
   detail;
   spatial relationships;
   minimizing artifacts; and
   quantitative measurement.

4. The method of medical imaging according to claim 2, wherein concurrently performing at least one reconstruction procedure includes at least one of:
   inputting the results from another reconstruction procedure;
   inputting a probability map from another reconstruction procedure; and
   inputting an attenuation map from another reconstruction procedure.

5. The method of medical imaging according to claim 2, further including:
displaying the fused medical diagnostic image on a display with a user selectable input; and wherein the user selectable input, based on input from a healthcare practitioner using an input device, displays the characteristic feature of each generated image associated with the input user selectable input.

6. A medical imaging system comprising:
a memory configured to store executable instructions; and
a processor configured to access said memory to execute said instructions and to:
   receive image data from a first diagnostic imaging apparatus for reconstruction into a medical diagnostic image;
   select at least two reconstruction procedures based on received input including a clinical purpose, each reconstruction procedure being optimized for one or more image characteristics;
   concurrently reconstruct the received imaging data from the first diagnostic imaging apparatus with each of the at least two selected reconstruction procedures to generate at least two images with different imaging characteristics;
   fuse the at least two generated images to form the medical diagnostic image which includes at least one imaging characteristic from each generated image;
   control a display device to display the fused medical diagnostic image;
   quantify a measurement of at least one of the imaging characteristics of a first image of the generated at least two images;
   substitute an area of a third image with an area of a second image of the at least two generated images on the third image; and
   overlay the quantified measurement on the third image with the substitution.

7. A medical imaging system comprising:
a memory configured to store executable instructions; and
a processor configured to access said memory to execute said instructions and to:
   receive image data from a first diagnostic imaging apparatus for reconstruction into a medical diagnostic image;
   select at least two reconstruction procedures based on received input including a clinical purpose, each reconstruction procedure being optimized for one or more image characteristics;
   concurrently reconstruct the received imaging data from the first diagnostic imaging apparatus with each of the at least two selected reconstruction procedures to generate at least two images with different imaging characteristics;
   fuse the at least two generated images to form the medical diagnostic image which includes at least one imaging characteristic from each generated image; and
   control a display device to display the fused medical diagnostic image;
wherein generating at least two images includes generating a first image, a second image, and a third image, and the processor is further configured to:
   quantify a measurement of tumor metabolic activity of the first image;
   fuse the second and the third images by substituting an area of the third image with an area of the second image; and
   overlay the fused second and third images with the quantified measurement of tumor metabolic activity; and
   wherein the second image is optimized for high resolution and the third image is optimized for artifact reduction.

* * * * *